(12) United States Patent
Baiamonte et al.

(10) Patent No.: US 7,804,798 B2
(45) Date of Patent: Sep. 28, 2010

(54) METHOD, SYSTEM AND COMPUTER PROGRAM PRODUCT FOR MANAGING THE TRANSMISSION OF INFORMATION PACKETS IN A TELECOMMUNICATION NETWORK

(75) Inventors: Valeria Baiamonte, Turin (IT); Daniele Franceschini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1113 days.

(21) Appl. No.: 10/535,283

(22) PCT Filed: Nov. 11, 2003

(86) PCT No.: PCT/EP03/12551

§ 371 (c)(1), (2), (4) Date: May 17, 2005

(87) PCT Pub. No.: WO2004/047379

PCT Pub. Date: Jun. 3, 2004

(65) Prior Publication Data

US 2006/0062171 A1    Mar. 23, 2006

(30) Foreign Application Priority Data

Nov. 20, 2002 (IT) .......................... TO2002A1009

(51) Int. Cl.
*H04Q 7/00* (2006.01)
(52) U.S. Cl. ...................................... 370/328; 370/315
(58) Field of Classification Search ........................ None
See application file for complete search history.

(56) References Cited

U.S. PATENT DOCUMENTS

| 5,914,950 | A | | 6/1999 | Tiedemann, Jr. et al. |
| 6,104,998 | A | * | 8/2000 | Galand et al. ................ 704/500 |
| 6,374,117 | B1 | * | 4/2002 | Denkert et al. .............. 455/522 |

FOREIGN PATENT DOCUMENTS

DE    19907085 C1    4/2000

(Continued)

OTHER PUBLICATIONS

"A QoS Oriented Bandwidth Scheduling Scheme . . . " by Dihong Tian et al, IEEE Apr. 2001.

(Continued)

*Primary Examiner*—Lester Kincaid
*Assistant Examiner*—Phuoc Doan
(74) *Attorney, Agent, or Firm*—Banner & Witcoff, Ltd.

(57) ABSTRACT

To manage the transmission of information packets on channels of a telecommunications network, the packets are organised into user queues received in respective buffers, measuring the occupancy level of the buffers. The users are sorted into respective classes (RT, NRT) identified by the service mode requested. After determining the propagation conditions on the transmission channel respectively associated to said users, the priority in the transmission of the packets is determined, choosing the order in which the respective queues are visited as a function of: —a first level priority, linked to whether the users belong to the respective classes of service (RT, NRT), —a second level priority, linked to at least a parameter chosen between the level of occupancy of the respective buffer and the propagation conditions of the respective channel.

31 Claims, 3 Drawing Sheets

FOREIGN PATENT DOCUMENTS

| | | |
|---|---|---|
| EP | 0 999 674 | 5/2000 |
| EP | 1 154 665 | 11/2001 |
| EP | 1030530 B1 | 10/2006 |
| WO | WO 00/28760 | 5/2000 |
| WO | WO 00/62572 | 10/2000 |
| WO | WO 01/63851 | 8/2001 |
| WO | WO 01/76304 | 10/2001 |
| WO | WO 02/085061 | 10/2002 |

OTHER PUBLICATIONS

"WCDM Packet Access" by J. Laiho et al., published 2001.
"Resource Allocation and Scheduling Schemes . . . " by R. Nannithamby et al. IEEE 2001.
"Packet Access" by M. Ritola et al., WCDMA for UMTS, 2001.
"A scheme for Throughput Maximization . . . " by S. Ramakrishna et al., IEEE 1998.
"3rd Generation Partnership Project" (Release 1999).

\* cited by examiner

METHOD, SYSTEM AND COMPUTER PROGRAM PRODUCT FOR MANAGING THE TRANSMISSION OF INFORMATION PACKETS IN A TELECOMMUNICATION NETWORK

CROSS REFERENCE TO RELATED APPLICATIONS

This application is the US national phase of PCT application PCT/EP2003/012551 filed 11 Nov. 2003 with a claim to the priority of Italian patent application TO2002A001009 itself filed 20 Nov. 2002.

FIELD OF THE INVENTION

The present invention relates to techniques for managing the transmission of information packets in a telecommunication network.

The invention was developed with particular focus on its possible application to the Packet Scheduling function in Radio Resource Management (RRM) in a mobile communication network, such as a network operating according to the standard called Universal Mobile Telecommunications System or UMTS.

For the sake of illustration simplicity, in the remainder of the present description nearly constant reference shall be made to this possible field of application. However, it will be appreciated that the scope of the invention is wholly general and hence not limited to said specific application context.

By way of general foreword to the description of the prior art, of the problems constituting the basis for the invention and of the solution proposed herein, it is useful to summarise some essential characteristics of the technical context into which the invention fits.

In the radio access network of the UMTS system, based on the WCDMA (Wide Band Code Division Multiple Access) radio interface, it is essential to optimise transmitted power in order to maintain interference levels as low as possible. It is fundamentally important to manage radio resources in such a way as to provide quality of services (QoS) and to assure an efficient exploitation of the resources made available by the system.

In essence, starting from the load at the uplink and downlink level, one can define different states of the network and correspondingly define suitable management strategies.

Figure 1:
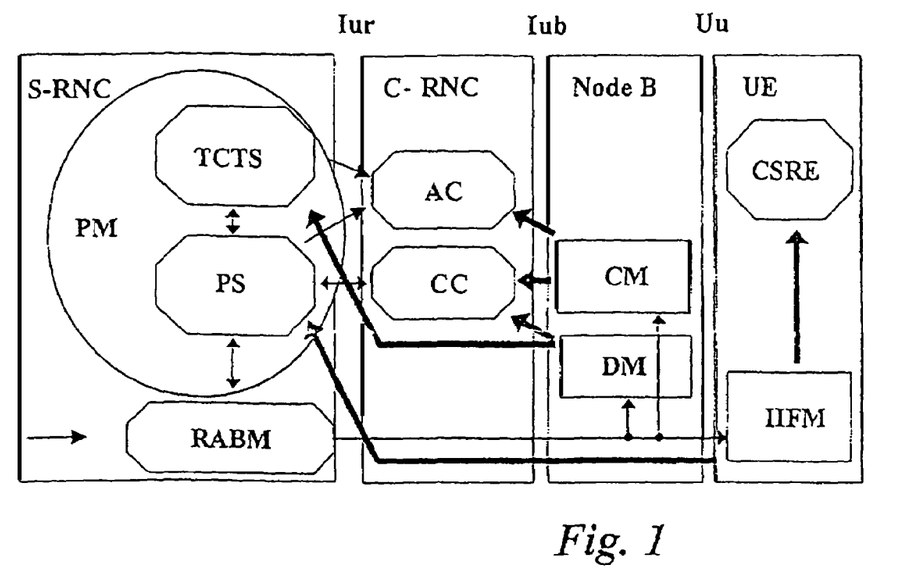
FIG. 1, relating to the radio resource management architecture in a packet mobile network and in itself relating both to the prior art and to the solution according to the invention, has already been described previously and it shall be further described hereafter.

The functional block diagram of FIG. 1 shows in general terms the Radio Resource Management (RRM) architecture in the application context described above.

The functions and acronyms shown in the figures are to be considered wholly known to those versed in the art and hence such as not to require a detailed description herein.

This holds true in particular for the functions identified by the modules S-RNC (Serving Radio Network controller), C-RNC (Controlling Radio Network Controller), Node B and UE and the interfaces Iur, Iub and Uu interposed between them.

The functional blocks shown in FIG. 1 are the following:
Packet Management (PM),
Transport Channel Type Switching (TCTS),
Packet Scheduling (PS),
Radio Access Bearer (RAB) Management (RABM),
Admission Control (AC),
Congestion Control (CC),
Common Measurements (CM),
Dedicated Measurements (DM),
Cell Sel/Resel Evaluation (CSRE), and
Inter/Intra Frequency Measurements (IIFM).

As stated, the radio resource management (RRM) architecture shown in FIG. 1 corresponds to general operating criteria which are wholly known in the art and hence such as not to require a detailed description herein, beyond the terms set out hereafter.

In any case, the procedures comprising the architecture of FIG. 1 are illustrated in detail in:
Harri Holma and Antti Toskala, "WCDMA for UMTS: radio access for third generation mobile communications", Wiley/& Sons Ltd 2001", and
3GPP TR 25.922 V3.7.0 (2002-03) Technical Report 3rd Generation Partnership Project; Technical Specification Group Radio Access Network; Radio resource management strategies.

The algorithms that regulate the operation of the management entities described above can co-operate for the best management of resources. The greater co-operation and interoperability, the more efficient the management mechanism, exploitation of available power and resource utilisation. The 3GPP standard does not specify the way in which such relationships can maximise system performance The UMTS system has the ability to offer a great number of value added services. In this scenario, packet switched services play an important role, constantly on the rise in the field of cellular communications. The application of data services to cellular systems requires transferring one or more packets through radio links. Packet switched services in the UMTS standard are characterised by connections between the network and mobile users through the set-up of appropriate channels, whose type depends on the type of service.

DESCRIPTION OF THE PRIOR ART

As stated, the UMTS standard does not specify any packet scheduling strategy.

In general, current proposals for packet scheduling focus on only one of the following three points:
compliance with Quality of Service (QoS) requirements, for instance in terms of delay and minimum allowed speed;
throughput maximisation;
total exploitation of available power.

The volume "Radio Network Planning and Optimisation" by J. Laiho et al., John Wiley & Sons, Ltd., 2001 describes a solution for allocating capacity to packet switched (PS) users in a radio network. In particular, after the allocation of a new PS user, the load is estimated to determine whether there is still any available capacity, or whether, on the contrary, the maximum load threshold has been exceeded and thus it is necessary either to proceed with re-dimensioning or to release resources.

The same document describes two types of scheduling, one based on code division, which tends to let multiple users transmit simultaneously, assigning low transmission speeds to them, and the other one based on time division, which tends to let one user transmit at a time. However, this way of operating does not allow to optimise the exploitation of available transmissive resources.

The document U.S. Pat. No. 6,374,117 discloses a method and a system for controlling a level of transmission power based on the queuing delay of the packets within a data transmission radio system. Following this approach, throughput in the transmission of data packets can be improved for certain connections with reference to queuing delay: in practice, the data packets that were subjected to a considerable queuing delay are allocated a higher quality connection by increasing their transmission power. The choice of whether to give priority to given packets or not by increasing transmission power can be made, for instance, according to a user's quality of service profile. According to this manner of proceeding, when the delay starts to increase, power is increased to improve quality. However, this intervention is susceptible to have negative effects in terms of interference.

In "A scheme for throughput maximization in a dual class CDMA System" by S. Ramakrishna and J. M. Holtzman, IEEE Journal on Selected Areas in Communications, Volume 16; issue 6, Aug. 1998, pp. 830-844, a study is presented which demonstrates the validity of a CDMA scheme which uses an uplink packet scheduling algorithm distinguishing between two classes of priority or of users, i.e. "delay-tolerant" users and "delay-intolerant" users. The foremost object of the proposed procedure is throughput maximisation alone, neglecting the other aspects considered above.

The goal pursued by the scheduling procedure proposed in "A QoS Oriented Bandwidth Scheduling Scheme on 3G WCDMA Air Interface" by D. Tian, J. Zhu; 2001 International Conference on Info-tech and Info-net, 2001 Proceedings ICII 2001—Beijing; Volume 2, pp. 139-144 is resource allocation based on distinguishing users into Priority classes, thus focusing on quality of service requirements. No attention, instead, is paid to the problem of optimisation in the allocation of the resources available to the cell.

In "Resource Allocation and Scheduling Schemes for WCDMA Downlinks" by R. Vannithamby, E. S. Sousa; IEEE International Conference on Communications, 2001; ICC 2001, Volume 5; pp. 1406-1410 a study is presented whose main goal is downlink resource allocation based on the power assigned to each individual mobile at the base station. Said power is the critical parameter whereon rate allocation to users is based. However, the problem of throughput maximisation and delay minimisation is not considered.

OBJECTS AND SUMMARY OF THE INVENTION

The object of the present invention is to provide a solution for managing packets in a telecommunication network, such as to overcome the above described intrinsic drawbacks of prior art solutions.

According to the present invention, said object is achieved thanks to what is specifically set out in the claims that follow.

In particular, it will be appreciated that the present invention is to be described in terms of method, as well as in terms of system, as well as in terms of computer product able to be directly loaded into the memory of at least a digital computer and susceptible of carrying out the steps of a method according to the invention when the computer product is executed on the digital computer.

In addition to being integrated correctly within the radio resource management (RRM) architecture, paying particular attention to the protocols prescribed by the radio layers of mobile communication networks (such as those operating according to the UMTS standard), the solution for managing packet transmission, described herein, allows to integrate Packet Scheduling (PS) algorithms and Transport Channel Type Switching (TCTS) algorithms, paying the utmost attention to an articulated set of requirements rather than to individual requirements.

BRIEF DESCRIPTION OF THE ACCOMPANYING DRAWINGS

The invention shall now be described, purely by way of non limiting example, with reference to the accompanying drawings, in which.

DETAILED DESCRIPTION OF EMBODIMENTS OF THE INVENTION

With reference to the function diagram of FIG. 1, the main purpose of the Packet Management function PM is to optimise packet transmission on the radio interface of the related system (deemed to be wholly known).

In general, in the application context of FIG. 1, it is possible to specify the measurements made in Nodes B and reported to the C-RNC by means of the N-Bap protocol, via Iub interface.

The measurements are:

RTWP (Received Total Wideband Power), defined as the power received over the entire band, including the noise generated by the receiver within the band defined by the reception filter.

Transmitted carrier power: it is defined as the ratio between total transmitted power and maximum power in transmission.

Depending on the values of these measurements, at least three different operative states can be defined:

normal operation, which occurs when the following two conditions are simultaneously met:
⇒ (RTWP/Thermal Noise Power)<=70% of the maximum Noise_Rise on the uplink;
⇒ Transmitted Carrier Power <=70%;

operation in alert conditions, which occurs when at least one of the following two conditions is met (respectively for uplink and downlink):
⇒ 70% of the maximum Noise_Rise on the uplink<= (RTWP/Thermal Noise Power)<=90% of the maximum Noise_Rise on the uplink;
⇒ 70%<=Transmitted Carrier Power<=90% pre-congestion operation, which occurs when at least one of the following two conditions is met (respectively for uplink and downlink):
⇒ 90% of the maximum Noise_Rise on the uplink<= (RTWP/Thermal Noise Power)<=maximum Noise_Rise on the uplink;
⇒ 90%<=Transmitted Carrier Power <=100%.

The above definitions are the current ones, well known to those versed in the art. It will also be appreciated that the values of 70% and 90% shown above are provided purely by way of example and can be modified by the operator.

The table that follows refers to various classes of services susceptible to be managed in a context such as a UMTS context.

| | Traffic Class | | | |
|---|---|---|---|---|
| | Conversational Class (Conversational RT) | Streaming Class (RT Streaming) | Interactive Class (Interactive best-effort) | Background Background (best-effort) |
| Example of Application | voice, video | facsimile (NT) audio and video streaming | Web Browsing | Background email downloading |

These services exhibit different characteristics in terms of Quality of Service or QoS.

The essential characteristics of conversational class services are given by the need to preserve certain time relationships between the information entities of the stream and to assure compliance with a maximum delay value.

In the case of streaming class services, it is necessary to maintain the time relationships between various information entities of the stream but, in general, delay requirements are less pressing than for conversational class services.

In the case of interactive class services, usually oriented to a general request-response configuration, an essential requirement is to preserve the information content or payload.

In the case of background services, requirements are even less stringent, since, though the requirement of preserving payload content remains, the recipient generally has no particular expectations in terms of delivery time.

In general terms, it is clear that the Packet Management function PM is able to exploit the fact, within the scope of packet services, it is necessary in any case to assure a low error percentages on data whilst, at least for some services, a certain quantity of delay can be tolerated.

Moreover, some services of the interactive or background class (as defined in a 3GPP UMTS context), such as the Web browsing service or the electronic mail service, are essentially best-effort services, for which no specific bit-rate level is guaranteed.

From this point of view, the delay tolerance characteristics and the best-effort nature of some of these services can be used with a certain degree of flexibility to reduce interference and correspondingly optimise capacity.

As shown in FIG. 1, the packet management function PM in turn is divided into two main functional entities, i.e.:
 packet scheduling or PS, and
 transport channel type switching or TCTS.

The main function served by packet scheduling is to manage the transmission of the packets of the supported services on the DCH links (dedicated channel), in order to optimise the radio interface.

The main purpose of the transport channel type switching is to monitor the transmission characteristics of each connection provided by the packet scheduling function, in order selectively to command the transition from the shared channel to a dedicated channel or vice versa.

The packet management module PM manages downlink packet scheduling: the significant parameters, which set a limit to the availability of system resources, are therefore the following:
 maximum power which the base station can deliver;
 lack of perfect orthogonality between the codes assigned to the users; and
 interference from other cells, perceived by UE receivers.

The PM module manages and optimises the totality of the packet transmission, both relating to the services which require the transmission of long and infrequent packets (Web browsing) and relating to services such as electronic mail, ftp in which a large quantity of long packets is transmitted for a short time interval, as well as services in which few, short packets are sufficient (chat, SMS).

The related functions reside, from an architectural viewpoint, in the Serving-RRM, together with the TCTS module and to the RABM module.

The RRM is called "serving" because it represents the set of management procedures located within the serving-RNC (S-RNC). This positioning enables it to have available all information about users registered in the Nodes-B belonging to the RNC, and to the type of radio connection required by them and set up in the network.

Preferably, the scheduling procedure within the PM module that manages the transmission on the dedicated DCH channel acts as described below when the load situation of the network, according to the definitions provided above, is that of normal operation.

In the currently preferred embodiment, for its decisions the procedure uses:
 traffic information about the number of active RT (real time) connection and their bit rate and signal/interference ratio (SIR) ratio pursued as a target or $SIR_{target}$;
 information about the data connections on dedicated channels which are set up and their characteristics of bit rate, $SIR_{target}$ and type of service requested;
 information on the Transport Formats or TF associated to each data connection on dedicated channel; and
 occupancy of the buffers of the RLC (Radio Link Control) layer in terms of quantity of bytes still to be transmitted.

The standard, as can be learned from the specification 3GPP-25.322 Technical Specification Group Radio Access Network; Radio Link Control (RLC) protocol specification (Release 1999), provides, as access protocols terminated in the Serving RNC, for DCH channels, the following layers:
 L1 (physical),
 MAC (Medium Access Control)
 RLC (Radio Link Control), and
 RRC (Radio Resource Control), only control plane.

The example of RRM architecture illustrated herein employs the protocols provided by the standard to implement its strategies.

The first three types of information are thus directly available within the Serving-RNC; on the other hand, in regard to the knowledge of the quantity to be transmitted, through an appropriate interwork between RLC, MAC and RRC, the occupancy values of the buffers of the RLC layer (buffer occupancy) can be made available to the MAC level and hence (through interwork between the two layers) to the RRC layer in which the decision-making part of the scheduling procedure resides.

The main steps of the procedure described herein are essentially three:
 Estimating residual capacity;
 Determining priorities;
 Assigning resources.

The procedure resides, in terms of residual capacity calculation and priority determination (first two items), at the RRC layer in the serving-RRM.

As will be explained hereafter, resource assignment evaluates the rate to be assigned to each user and consequently assigns the transport format, i.e. how many transport blocks to withdraw from the buffer at each transmission interval or TTI. This function always resides in the serving RRM.

The PS module pursues, among its various objectives, that of resource usage optimisation, assuring an efficient use of the complete capacity of the cell. The PS module must be able, through the knowledge of the characteristics of the services supported in the cell and of the number of active users, to calculate the residual capacity left available by the real time services, which are assigned the maximum priority, residual capacity left available by packet switching.

To estimate the aforesaid residual capacity, several prior art solutions can be employed. All this taking into account that, the more accurate said estimate, the better will be the results achievable when allocating residual capacity.

By way of example, said residual capacity can be determined noting that for a given service to be supported correctly, the following relationship must be satisfied:

$$\left[\frac{E_b}{N_0}\right]j, k = \frac{W}{r_{j,k}} \frac{P_{j,k} h_{j,k}}{I_{int,k} + I_{ext,k} + \eta_0 W} \geq \gamma_j \qquad j = 1 \ldots N$$

where:
⇒ W is chip rate, for instance equal to 3.84 Mchip/sec;
⇒ $P_{jk}$ is the power allocated for each individual user j in the cell K;
⇒ $r_{jk}$ is the bit rate of user j in the cell k,
⇒ $I_{int,k}$ is the intracell interference of the cell k,
⇒ $I_{exit,k}$ is intercell interference;
⇒ $\eta_0$ is the thermal noise spectral density;
⇒ $y_j$ is L'$E_b$/$N_0$ target to support the service requested by the user j;
⇒ $h_{jk}$ is path loss.

Since the scheduling technique illustrated herein focuses on the transmission on the downlink path, the description that follows shall focus on said path.

The downlink load of the cell can be expressed as:

$$\eta_{DL} = \sum_{i=1}^{N} \frac{1}{1 + \frac{W}{r_{j,k} \gamma_i}} ((1 - \alpha_i) + f_i)$$

where f is the ratio between intercell interference and intracell interference, measured at the receiver of every user equipment or UE and $\alpha_i$ is the orthogonality factor, a parameter that takes into account the perfect orthogonality between the codes assigned to the N users.

The formula can be simplified considering an average value of $\alpha_i$ and of f:

$$\overline{\eta_{DL}} = \sum_{i=1}^{N} \frac{1}{1 + \frac{W}{r_{i,k} \gamma_i}} ((1 - \overline{\alpha}) + \overline{f})$$

The module PS is organised and acts according to a discrete time structure based on scheduling time Ts. The time Ts paces the repetition of all the calculations and the actions of the procedure.

The procedure calculates, for each scheduling time Ts the capacity which can be used for packet services.

The maximum load is a threshold determined by the operator and it defines the maximum downlink capacity $\eta_{DL, max}$ in the normal operating state:

$$C_{TCS} = \left[\eta_{DL,max} - \sum_{i=1}^{N_{RT}} \frac{1}{1 + \frac{W}{r_{i,k} \gamma_i}} ((1 - \overline{\alpha}) + \overline{f})\right]$$

For each new user who requests a packet service, a respective buffer is allocated for packet transmission, at the RLC layer. The module PS acts on the basis of the characteristics of each user's buffer.

It is assumed that the function AC allows the entry into the system of interactive or background packet users, by evaluating exclusively that they can transmit at the minimum rate prescribed according to the set of transport formats (8 Kbit/s) and by not instead considering the peak rate negotiated with the network. It is not necessary to prevent such users from entering the system; the module PS will assure that they transmit without congesting the radio interface, checking and setting the rate of the dedicated connection on a case by case basis, in order not to exceed the limits imposed by the characteristics of the transmission on the downlink path, limits which were listed above.

At this point, setting the value of limit capacity, i.e. of residual capacity the base station can offer, based on the parameters listed at the start of the paragraph, it is possible to know which portion of resource can be allocated for packet users.

When assigning resources, a first distinction made by the module PS—as a first level or implicit priority criterion—is the one between:
real time (RT) users: these require conversational or streaming services ("RT packet" services or users);
non real time (NRT) users: these require interactive or background services ("NRT packet" services or users).

Figure 2:
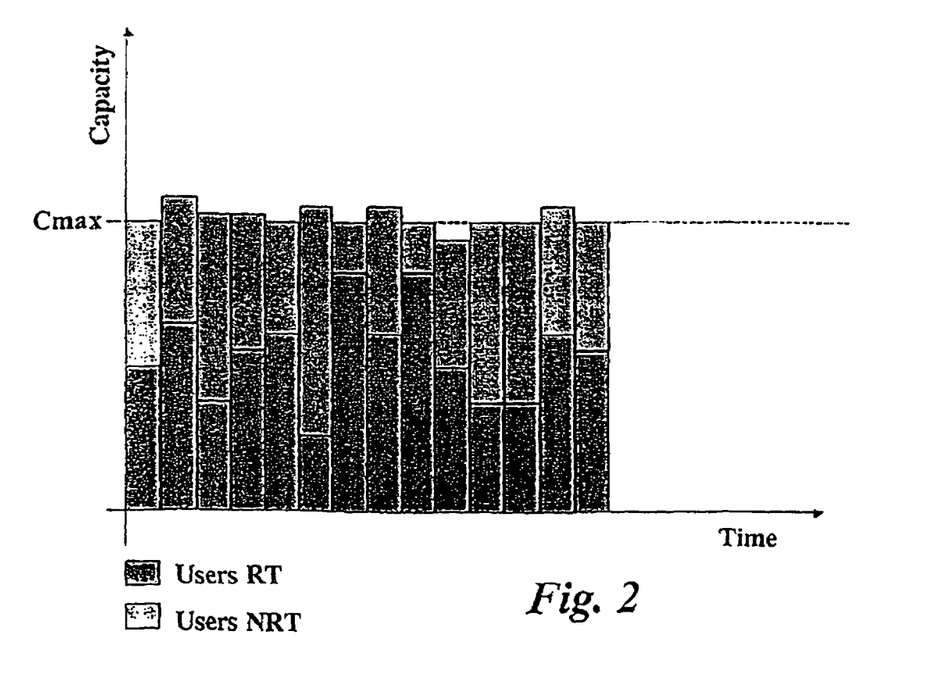
FIG. 2 shows the possible variation in the capacity occupied by the users of a cell of a mobile communication system as a function of time.

With reference to FIG. 2, it is apparent that the module PS tries to adapt the transmission of packet users to the dynamic variations of residual available capacity.

Obviously, this can take place with a discrete timing. The calculations are repeated at each step, called $T_s$ which represents the time that elapses between an application of the procedure and the subsequent one. It is therefore presumed, with a reasonable degree of approximation if a correct value is chosen for the $T_s$ parameter, that the RT load does not change between a step and the subsequent one. The smaller $T_s$, the more dynamic and adaptive the application of the scheduling to the system will be.

The calculation of priorities, which consists of selecting the order wherein the queues containing the user packets will be visited, is based essentially on three criteria:
a) a first level priority criterion, linked, as stated, to the belonging to the classes "RT packet" or "NRT packet": hence, this is an implicit priority, linked to the nature of the information conveyed by the packets;
b) two second level priority criteria, relating to the operating dynamics of the system, linked respectively:
b1) to the occupancy of the RLC layer buffers, and
b2) to the propagation conditions of the channel.

The above criteria are applied observing first the belonging to the two classes of service.

In the currently preferred embodiment of the invention, a further distinction is made between those who belong to the same class of service according to the greater occupancy of the buffers, i.e. causing the selection or extraction, among the users with the same first level priority, of the user who has higher buffer occupancy.

For equal buffer occupancy, the user who demonstrates best channel propagation conditions is extracted in view of transmission.

Naturally, at least under particular conditions of use, the second level priority criteria described above can be applied in complementary fashion, or exchanging one for another.

In this case, still observing in the first place the belonging to the two classes of service, a distinction is made between those belonging to the same class of service according to the propagation conditions of the channel. Among users with the same first level priority, the user demonstrating the best channel propagation conditions is thus selected or extracted.

For equal channel propagation conditions, the user with the greatest buffer occupancy is extracted, in view of transmission.

The occupation of the buffer at the RLC layer can easily be determined by evaluating, for example, the number of bytes present in the buffer.

Channel propagation conditions can instead be determined in terms of signal/interference ratio (SIR), for instance as a function part of a measurement (SIR_Error) defined as the difference between the measured value ($SIR_{measured}$) and the target value ($SIR_{target}$) of the signal/interference ratio.

Figure 3:
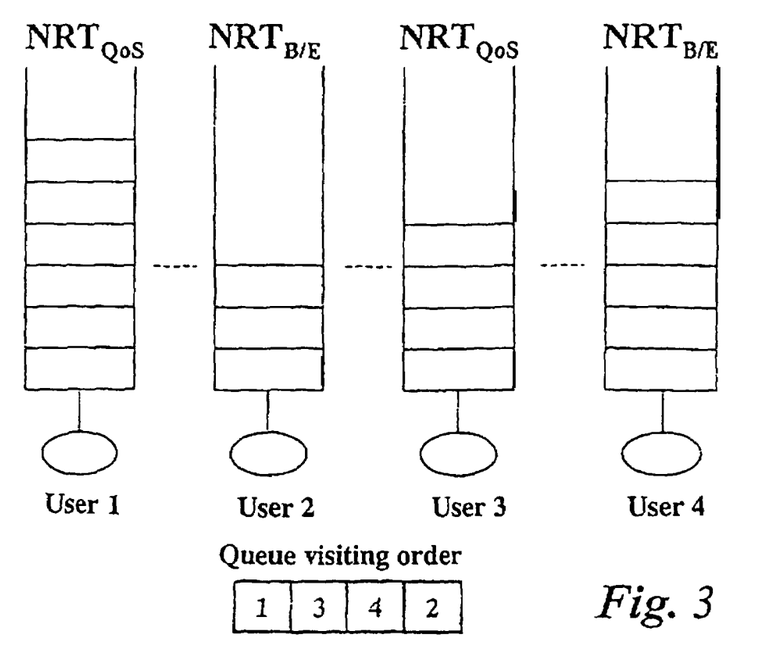
FIG. 3 shows an example of determination of the order of visitation of the queues in a solution according to the invention.

FIG. 3 shows an example of how the queue visiting order is calculated.

After assuring that residual capacity is exploited in the best possible fashion, in order to allocate all available power to the base station, and determining the order of visitation of the queues which obtain the data packets, the procedure must apply its resource allocation policy, i.e. it must decide as to allocate available capacity in an optimised manner, maximising total throughput and minimising user delay.

In practice, after performing its calculation on how to subdivide capacity among data users, the packet scheduling module calculates the maximum transport format TF employable for the particular user and communicates it via the transport format set or TFS to the MAC layer, which will use this information in the selection of the transport format to each TTI. Moreover, if this becomes necessary, the transmission can be suspended or resumed through the suspend and resume procedure, respectively.

The procedure tries to assign to the highest priority user the transport format corresponding to the negotiated peak rate. If it fails, it tries to allocate the immediately lower format, continuing with its attempts until the allocated rate falls within the quantity of capacity available.

In most cases, it may occur that, after allowing the top priority user to transmit with the maximum rate, some capacity is still available in the cell. Since the primary task of the module PS is to optimise data transmission, preventing capacity wastage, the procedure implemented for the top priority user is repeated, for the next highest priority user, until there are no more resources or active users.

Figure 4:
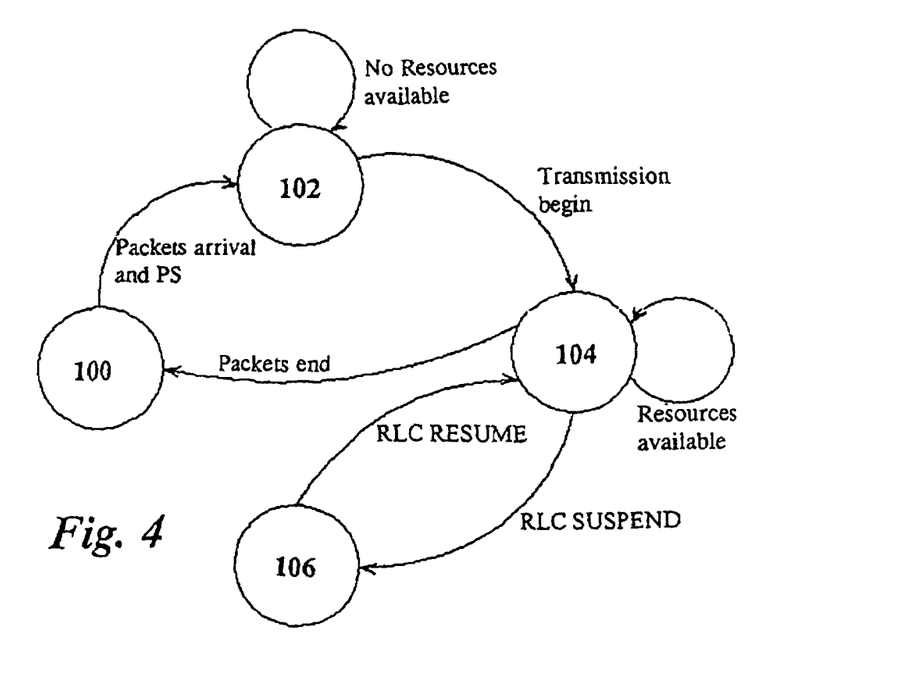
FIG. 4 is a state diagram describing a procedure susceptible to be implemented within the present invention.

FIG. 4 shows the diagram that describes the states characterising the downlink transmission to a mobile terminal.

The base station—relative to the data connection of that given mobile terminal—is in the Idle state (100) until the related buffer starts filling with packets.

The change in state, from "Idle" to "Data to be Transmitted" (102) takes place when the need to set up a radio channel for the user is verified, since the buffer has started to fill with packets. It is important that the system reacts quickly to the changes that occur, to prevent the accumulation of excessive delay in the buffer.

Permanence in this state is linked to resource availability. At each scheduling step $T_s$, the assessment is made as to whether a data channel can be assigned to the mobile in question; if the capacity available to the cell is sufficient, a Radio Access Bearer (RAB) is set up, so a radio link is created between the BS and the mobile and Data Transmission can begin. Permanence in this state (104) continues as long as there are resources to allocate to the mobile.

When resources are no longer available, the procedure does not order the radio link to be dropped but could invoke, for instance, a procedure prescribed by the standard: CRLC-Suspend (Control RLC).

The mobile will then be in a suspended state (106): hence, it will minimise its occupancy of the radio interface resources, correspondingly minimising interference, but its connection will remain standing from the RLC layer up.

In the suspended state, the RLC entity no longer sends to the underlying MAC level—or receives in the opposite direction—any PDUs (Protocol Data Units) with a higher sequence number than the one indicated by the suspend primitive. Once the resume primitive is recalled, the RLC level will re-start transmitting PDUs from the point where it has suspended.

The TCTS module monitors the transmission buffer of each individual packet connection to understand whether the type of transport channel allocated to support a certain service is the right one or not.

In general, a packet service can be supported on:

a shared channel (Random Access Channel or RACH or else Forward Access Channel or FACH), when the service requires the transmission of small packets and with low frequency (a typical example is represented by the transmission of SMS message); or a dedicated channel or DCH when service demands in terms of minimum required bit-rate are high: for instance, this is the case of browsing services on fast network and of real time services.

During the normal operation of the network the need may emerge to adapt the transmission characteristics dynamically to the imposed changes, for instance modifying the type of transport channel used.

Causes which may bring about such a type channel switch are, for instance:

renegotiation of the service, both uplink and downlink, the congestion control module CC orders to switch all best-effort channels from dedicated channel to share channel to solve a congestion situation, and particular propagation conditions.

Service renegotiation is the typical case requiring a transport channel type switch.

For instance, it is supposed that a user requests a browsing service on fast network and then, during normal operation, continues his/her session by simply sending SMS messages. In this case, bit-rate demands on the radio channel are substantially reduced, thereby imposing transport channel switching.

To verify when such a situation emerges, the uplink and downlink transmission buffers are monitored as a function of specific thresholds applied to said buffers.

Figure 5:
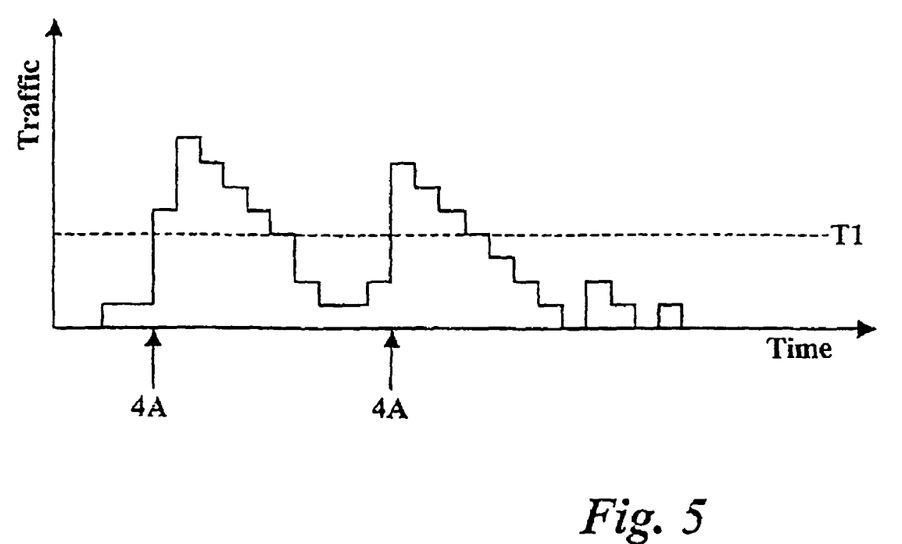
FIGS. 5 and 6 show, again in the same application context of the invention, situations in which a volume of traffic exceeds an absolute upper threshold or drops below an absolute lower threshold.

When traffic volume grows, reaching a certain threshold T1, an event occurs (4A) which is reported to the serving RNC.

If an event of this kind, schematically shown in FIG. 5, emerges at the uplink level or at the downlink level, a switch from shared channel to dedicated channel can be ordered.

Figure 6:
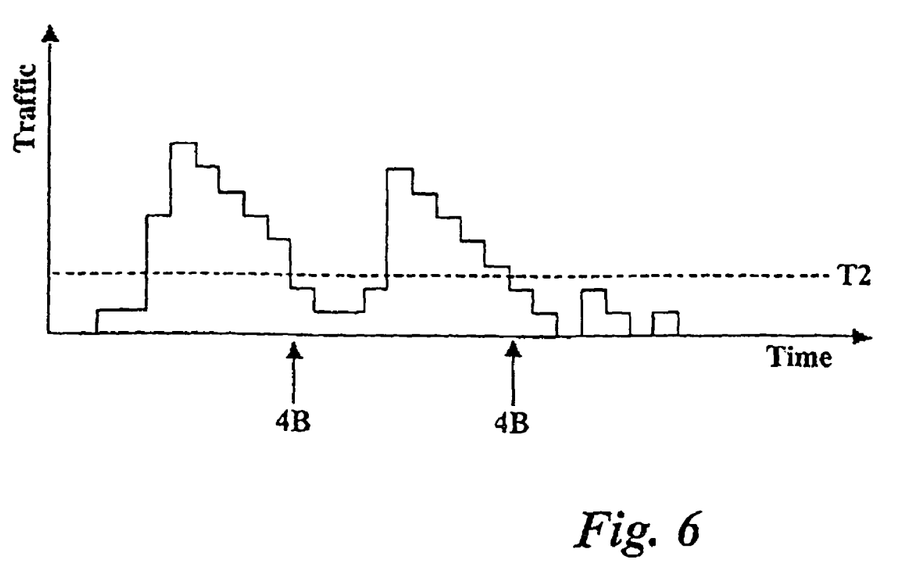

If, on the contrary, traffic volume drops below a reference threshold T2, an event 4B takes place which is also reported to the serving RNC.

This situation is represented in FIG. 6. If said event occurs either at the uplink level or at the downlink level, a switch can be produced from dedicated channel to shared channel.

Naturally, when a switch from shared channel to dedicated channel occurs, a new access step is required along with the allocation of the dedicated channel.

In this case, behaviour corresponds to the typical behaviour of the access control module AC and of the Radio Access Bearer Management module or RABM. Hence, there is a strict dependence on network state and load.

In the solution illustrated herein, the threshold level which determines the switch from shared channel to dedicated channel and/or vice versa can be varied over time. This fact is highlighted in FIGS. 5 and 6, where different threshold levels T1 and T2 are shown.

The variation of the threshold level in question can take place according to traffic parameters such as, for instance, network state (normal—alarm conditions) or the conditions of the channel.

For instance, when the load (in the normal operating state) is reduced, it is possible to encourage use of the dedicated channel (DCH) assuring better performance from the quality of service viewpoint, since no critical situations emerge from the interference point of view.

On the contrary, when the network operates in the alarm operating state, the threshold is set dynamically to make it more difficult to switch to the dedicated channel. At the end, when the network has to operate in near-congested state, the threshold is further modified, so that switching to the dedicated channel is practically forbidden.

In particularly preferred fashion, it is possible to operate in such a way that switching from the dedicated channel to the shared channel takes place even when propagation conditions are very poor, so the bit-rate can be reduced, for instance below 16 Kbps.

It is thereby possible to reduce a connection when the event designated as 4A or the event designated as 4B take place, or upon reaching a threshold (which can be set by the operator) that indicates the poor quality of the radio link.

For this purpose, one can for instance use the measurement (SIR_Error) defined as the difference between the measured value ($SIR_{measured}$) and the target value ($SIR_{target}$) of the signal/interference ratio or SIR.

Naturally, without altering the principle of the invention, the construction details and the embodiments may be widely varied from what is described and illustrated herein, without thereby departing from the scope of the invention. In this perspective, it should be recalled once again that, although for the sake of simplicity of illustration the present invention makes nearly constant reference to the possible application of the invention to an UMTS context, the scope of the invention is quite general and hence not limited to said specific context of application.

The invention claimed is:

1. A method for managing the transmission of information packets on channels of a telecommunications network comprising the steps of:
   arranging said packets into user queues received in respective buffers at a base station, by measuring the occupancy level of said buffers,
   sorting users into respective real time and non real time classes identified by service modes requested by said users,
   measuring propagation conditions on the transmission channel respectively associated to said users, and
   determining a priority in the transmission of said packets, by choosing an order in which said respective queues are visited as a function of:
      a first level priority, linked to whether said users belong to said respective real time and non real time classes,
      a second level priority, linked to both the occupancy level of the respective buffer and the propagation conditions of said respective channel.

2. A method as claimed in claim 1, wherein among the users with the same first level of priority, the user with the highest buffer occupancy and the best channel propagation condition is chosen.

3. A method as claimed in claim 1, further comprising the step of dividing said users into:
   at least a first real time class, comprising users who require conversational or streaming services, and
   at least a first non real time class, comprising users who require interactive or background services.

4. A method as claimed in claim 1, further comprising the steps of:
   determining the transmission capacity available for the transmission of said packets, by identifying a negotiated peak transmission rate value,
   trying to assign to the highest priority user the transport format corresponding to said peak rate, by transmitting the related queued packets in case of positive outcome of said assignment,
   in case of negative outcome of said assignment, trying to allocate to said highest priority user the next highest transport format, said attempts with lower format being continued until the allocated rate falls within the available capacity.

5. A method as claimed in claim 4 wherein, after transmitting the information packets associated to said highest priority user, the step of detecting any available residual transmission capacity and the step of repeating the previous steps for said higher priority user, for the user with the next highest priority, until there are no more said transmission resources or active users.

6. A method as claimed in claim 1, applied to a transmission network organised in respective cells in which said transmission resources are shared with real time services which are given top priority, further comprising the step of estimating the residual capacity of the respective cell left free by said real time services available for the transmission of said information packets.

7. A method as claimed in claim 1, further comprising allowing access into the system, via an access control function, to users with information packets to be transmitted; the access being conducted, for at least some of said non real time users by evaluating exclusively the possibility for said users to transmit their information packets with the minimum rate prescribed by the set of transport formats of the network.

8. A method as claimed in claim 1 or claim 7, further comprising providing a packet scheduling function, configured to verify that at least some of said non real time users transmit without congesting the radio interface, by controlling and setting, on a case by case basis, the rate of the respective dedicated connection in order not to exceed a given limit imposed by the characteristics of said network.

9. A method as claimed in claim 1, further comprising the step of organising the transmission of said information packets by means of a state machine which allows:
   a first state corresponding to the recognition that information packets are present in at least one of said respective buffers,
   a second state corresponding to the transmission of said information packets by means of corresponding transmission resources, and
   a suspended state corresponding to the recognition of the unavailability of resources for the transmission of said information packets with the conservation of said transmission channel, said state machine being configured to evolve anew from said third state to said second state without dropping said transmission channel, when said transmission resources become available again.

10. A method for managing the transmission of information packets on a communication network organised in cells, in which said information packets can be selectively transmitted, within said cells, both on a shared channel and on a dedicated channel, comprising the steps of:

transmitting the information packets of a determined user on said shared channel or on a respective dedicated channel as a function of a related traffic volume, defining at least one threshold of traffic level, determining at a serving radio network controller a switching of the transmission of the information packets of said determined user on said dedicated channel starting from said shared channel when the related traffic level grows reaching said at least one threshold and determining at said serving radio network controller the switching of the transmission of the information packets of said determined user on said shared channel starting from said dedicated channel when said respective traffic volume drops reaching said at least one threshold, and selectively varying the level of said at least one threshold.

11. A method as claimed in claim 10, further comprising the step of: reducing said at least one threshold in conditions of reduced traffic in order to favour the use of said dedicated channel.

12. A method as claimed in claim 10, further comprising the step of: raising said at least one threshold, making more difficult the switch to said dedicated channel starting from said shared channel, under alarmed operating conditions of said network.

13. A method as claimed in claim 10, further comprising the steps of:

detecting a state of approaching congestion of said network; and inhibiting the switching to said dedicated channel starting from said shared channel under said state of approaching congestion of said network.

14. A method as claimed in claim 10, further comprising the steps of:

measuring the propagation conditions on the transmission channel respectively associated to said determined user as said dedicated channel; and determining the switching of the transmission of the information packets of said determined user on said shared channel starting from said dedicated channel in the presence of a degradation of said propagation conditions below a threshold value.

15. A method as claimed in claim 14, wherein said switching on said shared channel starting from said dedicated channel is determined as a function of the signal/interference ratio.

16. A method as claimed in claim 15, wherein said switching to said shared channel starting from said dedicated channel is determined based on the difference between the measured value determined when the measured value and the target value of the signal/interference ratio reach a selectively determined threshold value.

17. A system for managing the transmission of information packets on channels of a telecommunications network, comprising:

a plurality of respective buffers configured to receive said packets in user queues at a base station; said users being sorted into respective real time and non real time classes identified by the service modes requested by said users, detector modules able to measure the propagation conditions on the transmission channel respectively associated to said users, and a module for managing packet scheduling configured to determine the priority in the transmission of said packets, by choosing the order in which said respective queues are visited as a function of:

a first level priority, linked to whether said users belong to said respective real time and non real time classes, a second level priority, linked to both the occupancy level of the respective buffer and the propagation conditions of said respective channel.

18. A system as claimed in claim 17, wherein said module for managing packet scheduling is configured to choose, among the users with the same first level priority, the user who has the highest buffer occupancy and demonstrates the best channel propagation conditions.

19. A system as claimed in claim 17, wherein said module for managing packet scheduling is configured to:

determine the transmission capacity available for the transmission of said packets, by identifying a negotiation peak transmission rate value, try to assign to the highest priority user the transport format corresponding to said peak rate, by transmitting the related queued packets in case of positive outcome of said assignment, in case of negative outcome of said assignment, try to allocate to said highest priority user the next highest transport format, said attempts with lower format being continued until the allocated rate falls within available capacity.

20. A system as claimed in claim 19, wherein said module for managing packet scheduling is configured to detect, after transmitting the information packets associated to said highest priority user, any available residual transmission capacity and to repeat the operations carried out for said highest priority user until there are no more said transmission capacity or active users.

21. A system as claimed in claim 17, associated to a transmission network organised in respective cells having a determined transmission capacity shared with real time services whereto is assigned the highest priority, wherein said module for managing packet scheduling is configured to estimate a residual capacity of the respective cell left free by said real time services available for the transmission of said information packets.

22. A system as claimed in claim 17, further comprising an access control module configured to allow users with information packets to be transmitted to enter the system; the access being conducted, for at least some of said non real time users by evaluating exclusively the possibility for said users to transmit their information packets with the minimum rate prescribed by the set of transport formats of the network.

23. A system as claimed in claim 17, wherein said module for managing packet scheduling is configured to verify that at least some of said non real time users transmit without congesting the radio interface, controlling and setting on a case by case basis the rate of the respective dedicated connection in order not to exceed a given limit imposed by the characteristics of said network.

24. A system as claimed in claim 17, further comprising a state machine which allows:

a first state corresponding to the recognition of the fact that information packets are present in at least one of said respective buffers, a second state corresponding to the transmission of said information packets by means of corresponding transmission resources, and a suspended state corresponding to the recognition of the unavailability of resources for the transmission of said information packets with the conservation of said transmission channel, said state machine configured to evolve anew from said third state to said second state without dropping said transmission channel, when said transmission resources become available again.

25. System for managing the transmission of information packets on a communication network organised in cells, in which said information packets can be selectively transmitted, within said cells, both on a shared channel and on a dedicated channel, comprising a module for managing packet scheduling configured to:
- transmit the information packets of a determined user on said shared channel or on a respective dedicated channel as a function of a related traffic volume,
- define at least one threshold of traffic level, determining the switching of the transmission of the information packets of said determined user on said dedicated channel starting from said shared channel when the related traffic level grows reaching said at least one threshold and determine the switching of the transmission of the information packets of said determined user on said shared channel starting from said dedicated channel when said respective traffic volume drops reaching said at least one threshold, wherein said module for managing packet scheduling is configured selectively to vary the level of said at least one threshold.

26. A system as claimed in claim 25, wherein said module for managing packet scheduling is configured to reduce said at least one threshold under reduced load conditions in order to favour the use of said dedicated channel.

27. A system as claimed in claim 25, wherein said module for managing packet scheduling is configured to raise said at least one threshold, making more difficult the switching towards said dedicated channel starting from said shared channel under alarmed operating conditions of said network.

28. A method as claimed in claim 25, wherein said module for managing packet scheduling is made sensitive to a state of approaching congestion of said network and is configured to inhibit the switching to said dedicated channel starting from said shared channel, under said state of approaching congestion of said network.

29. A system as claimed in claim 25, further comprising at least one detector module configured to detect the propagation conditions on the transmission channel respectively associated to said user as said dedicated channel and said module for managing packet scheduling is configured to determine the switching of the transmission of the information packets of said determined user on said shared channel starting from said dedicated channel in the presence of degradation of said propagation conditions below a threshold value.

30. A system as claimed in claim 29, wherein said module for managing packet scheduling is configured to determine said switching on said shared channel starting from said dedicated channel as a function of the signal/interference ratio detected by said at least one detector module.

31. A system as claimed in claim 30, wherein said module for managing packet scheduling is configured to determine said switching on said shared channel starting from said dedicated channel based on the difference between the measured value and the target value of the signal/interference ratio reaching a selectively determined threshold value.

* * * * *